US009319993B1

(12) United States Patent
Urbanus et al.

(10) Patent No.: US 9,319,993 B1
(45) Date of Patent: Apr. 19, 2016

(54) INJECTING ACTIVE PERIODS INTO SCHEDULED INACTIVE PERIODS

(71) Applicant: AMAZON TECHNOLOGIES, INC., Reno, NV (US)

(72) Inventors: Mark Sander Urbanus, San Jose, CA (US); Robert Joseph Suk, Santa Clara, CA (US); Justin Michael Harrison, San Francisco, CA (US); Karl Jonsson, San Carlos, CA (US); Venkata Suri Maddhula, Sunnyvale, CA (US); Aaron Michael Bromberg, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 76 days.

(21) Appl. No.: 14/292,568

(22) Filed: May 30, 2014

(51) Int. Cl.
*H04B 7/00* (2006.01)
*H04W 52/22* (2009.01)

(52) U.S. Cl.
CPC .................... *H04W 52/22* (2013.01)

(58) Field of Classification Search
CPC .... H04W 72/00; H04W 52/223; H04W 52/22
See application file for complete search history.

(56) References Cited

U.S. PATENT DOCUMENTS

| 2006/0203731 | A1* | 9/2006 | Tiedemann | H04L 47/10 370/235 |
| 2012/0115552 | A1* | 5/2012 | Bhattacharya | H04W 52/0261 455/574 |
| 2012/0289224 | A1* | 11/2012 | Hallberg | H04W 52/223 455/424 |
| 2013/0044658 | A1* | 2/2013 | Zhu | H04W 56/0035 370/311 |
| 2013/0190006 | A1* | 7/2013 | Kazmi | H04W 64/006 455/456.1 |
| 2013/0250825 | A1* | 9/2013 | Gosal | H04W 52/0232 370/311 |

* cited by examiner

*Primary Examiner* — Edward Urban
*Assistant Examiner* — Mohammed Rachedine
(74) *Attorney, Agent, or Firm* — Lowenstein Sandler LLP

(57) ABSTRACT

A processing device determines a usage schedule for a mobile device based on one or more first criteria, the usage schedule comprising a scheduled active period of the mobile device and a scheduled inactive period of the mobile device. The processing device identifies an additional active period for the mobile device that is based on one or more second criteria. The processing device causes the mobile device to transition into a low power state during the scheduled inactive period and to transition out of the low power state during the additional active period prior to the scheduled active period, wherein the mobile device will perform a scheduled operation during the additional active period and prior to the scheduled active period.

20 Claims, 12 Drawing Sheets

INJECTING ACTIVE PERIODS INTO SCHEDULED INACTIVE PERIODS

BACKGROUND

Battery life is an important issue for mobile devices. Even when a mobile device is idle or in a low power mode (e.g., suspended), hardware components of the mobile device consume power. Moreover, while hardware components are enabled, any application may wake up the mobile device and use those hardware components. Such activity may be performed even if the mobile device is not actively being used by a user. Each time the mobile device is woken up and/or a hardware component is used, additional power is consumed. Accordingly, a battery of a mobile device may be unnecessarily used to power modules without any interaction from a user. Hence, a user may be forced to charge the mobile device with increased frequency.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1:
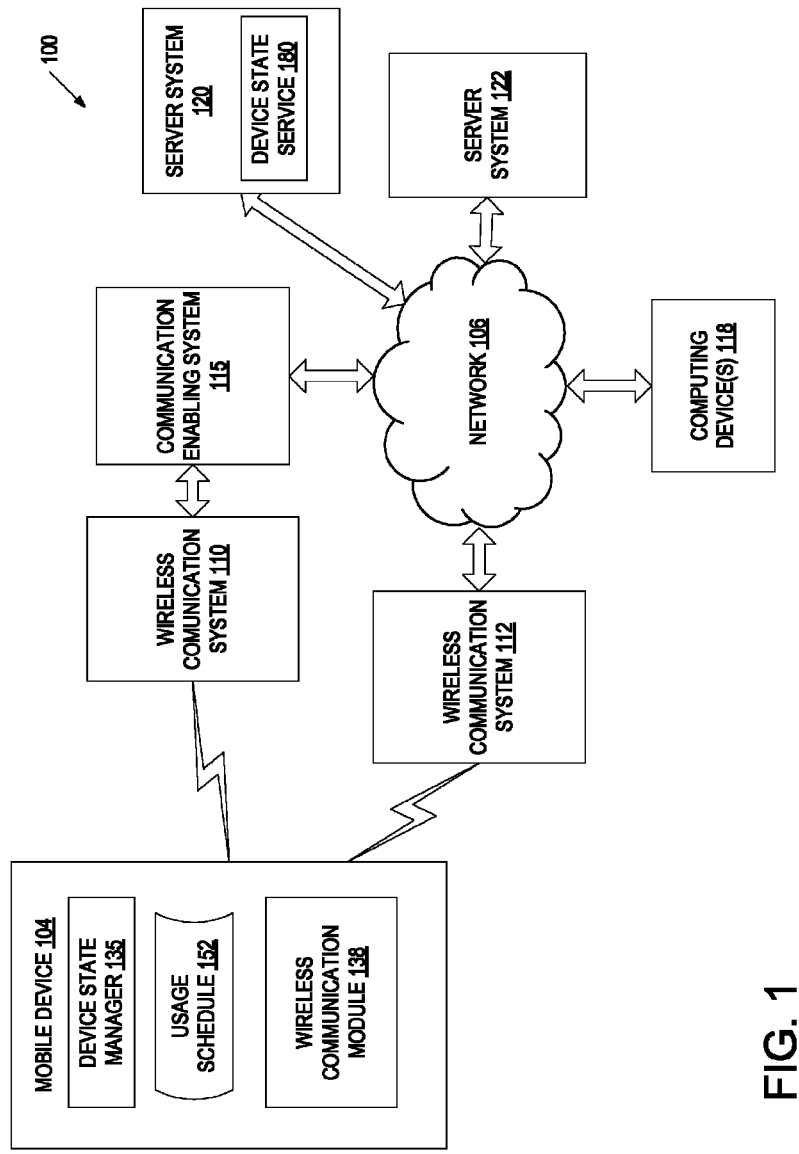
FIG. 1 is a block diagram of an example network architecture including a mobile device with a device state manager, in accordance with one embodiment.

Mobile devices have batteries with a finite amount of available power. Each hardware component of a mobile device consumes some amount of power when it is under power, even when the mobile device is in a suspended state. Thus, any hardware component that is not shut off or deactivated will have some impact on battery life. Furthermore, many applications will periodically wake-up the mobile device to use hardware components such as a wireless (e.g., Wi-Fi®) radio or global positioning system (GPS) receiver. For example, social network applications and email applications may periodically wake-up the mobile device to check for updated information. However, such wake-up events are frequently not associated with user activity and may be immaterial to a user experience.

Embodiments described herein provide a device state manager and/or service that determines a usage schedule for a mobile device based on monitored activity. The usage schedule includes scheduled active periods in which the mobile device remains in a standard suspended state while not in use. The usage schedule further includes inactive periods in which the mobile device is placed into a low power state. While the mobile device is in the low power state, one or more power consuming hardware components are disabled (e.g., placed into a reduced power state or powered off). Additionally, operations such as alarm wake-ups may be restricted and/or components such as a processing device may be throttled. Since the usage schedule is determined based on monitored activity for the mobile device, user impact is minimal. For example, it may be determined that a user uses the mobile device only between 7:00 PM and 10:00 PM every day. Accordingly, the usage schedule may identify active periods of 7:00 PM-10:00 PM every day and inactive periods of 12:00 AM-7:00 PM and 10:00 PM-12:00 AM every day. During the inactive periods, power hungry components such as a Wi-Fi module and a wireless area network (WAN) module may be shut off.

Further embodiments herein provide a device state manager and/or service that determines additional active periods to inject into the usage schedule. To determine an additional active period, the device state manger and/or service predict data that would be sent to the mobile device if the mobile device were not in a low power state (e.g., if a Wi-Fi module of the mobile device were not disabled). The device state manager may then determine a timing for an additional active period that will be sufficient to enable the mobile device to complete transfer of the predicted data prior to a scheduled active period. The determined additional active period may then be injected into the usage schedule. Injection of the additional active period into the usage schedule ensures that all data such as application updates, new content from subscriptions, and so forth is available for use or consumption when a next scheduled active period begins. Thus, battery life of the mobile device may be lengthened without impacting a user experience.

FIG. 1 is a block diagram of an exemplary network architecture 100 in which embodiments described herein may operate. The network architecture 100 may include multiple server systems 120, 122 and a mobile device 104 capable of communicating with one or both of the server systems 120, 122 via a network 106. Network 106 may be a public network (e.g., the Internet), a private network (e.g., a local area network (LAN), wide area network (WAN), intranet, etc.), or combination thereof.

The mobile device 104 may include any type of mobile computing device that has a finite power source (e.g., that is powered by a battery). Examples of mobile devices 104 include electronic book readers, portable digital assistants, mobile phones, laptop computers, portable media players, tablet computers, cameras, video cameras, netbooks, notebooks, portable gaming consoles, portable media players (e.g., portable music players, portable video players, etc.), wearable devices (e.g., watches, fitness monitors, Google® Glass, etc.), and the like.

The mobile device 104 may be configured with functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content.

The mobile device 104 includes a wireless communication module 138 that sends and receives information to wireless communication systems 110, 112. The wireless communication module 138 may be a wireless network interface controller (WNIC) or a wireless modem. Examples of WNICs include a Wi-Fi® network interface controller (NIC), a Bluetooth® NIC, and a Zigbee® NIC. Examples of wireless modems include second generation of mobile communications technology (2G) wireless modems, third generation of mobile communications technology (3G) wireless modems and fourth generation of mobile communications technology (4G) wireless modems, as well as multi-mode wireless modems that can communicate using some or all of 2G, 3G and/or 4G telecommunications protocols. In one embodiment, the wireless communication module 138 and the processing device of the mobile device 104 are two logics of a single integrated circuit. Alternatively, the wireless communication module 138 and the processing device may be discreet devices.

The server system 120 and the mobile device 104 deliver and/or receive media items, applications, upgrades, and/or other information via the network 106. For example, the mobile device 104 may download or receive data from the server system 120. The server system 120 also receives various requests, instructions and other data from the mobile device 104 via the network 106. The server system 120 may include one or more machines (e.g., one or more server computer systems, routers, gateways, etc.) that have processing and storage capabilities to provide the above functionality.

Communication between the server system 120 and the mobile device 104 may be enabled via any communication infrastructure. One example of such an infrastructure includes a combination of a wide area network (WAN) and wireless infrastructure, which allows a user to use the mobile device 104 to purchase items and consume items without being tethered to the server system 120 via hardwired links. The wireless infrastructure may be provided by one or multiple wireless communications systems, such as wireless communications system 110 and wireless communication system 112. One of the wireless communication systems 110, 112 may be a Wi-Fi access point connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the mobile device 104.

The communication infrastructure may also include a communication-enabling system 115 that serves as an intermediary in passing information between the server system 120 and the wireless communication system 110. The communication-enabling system 115 may communicate with the wireless communication system 110 (e.g., a wireless carrier) via a dedicated channel, and may communicate with the server system 120 via a non-dedicated communication mechanism, e.g., a public Wide Area Network (WAN) such as the Internet.

In one embodiment, server system 120 acts as an intermediary between server system 122 and mobile device 104. An application installed on mobile device 104 may initiate a connection with server system 122. While the connection is active, server system 122 may send data in network packets to server system 120, and server system 120 may forward these network packets to mobile device 104. Similarly, the mobile device 104 may send network packets to server system 120, and server system 120 may forward the network packets to server system 122. In alternative network configurations, the mobile device 104 may connect to server system 122 directly, without using server system 120 as an intermediary or proxy.

The mobile device 104 may be capable of receiving and executing applications that may perform various functions. Applications may be developed by an entity affiliated with the mobile device (e.g., a manufacturer of the mobile device 104) and/or by third parties. For example, applications provided by social network services, game developers, news providers, and so forth may be installed on the mobile device. Each of the applications that are installed on the mobile device 104 may use application programming interfaces (APIs) provided by the mobile device for waking up the mobile device, communicating with remote computing devices (e.g., server systems), and/or performing other operations.

Mobile device 104 includes, among other physical and logical modules, a device state manager 135 and a wireless communication module 138. The device state manager 135 uses a usage schedule 152 to determine what state to place the mobile device in at any given time. In one embodiment, the device state manager 135 applies one of two states to the mobile device 104 at any given time. The two states may include a standard operating state and a low power state. While in the standard operating state, the mobile device may be fully active (e.g., with a display powered on, a processing device executing instructions, etc.) or suspended (e.g., with a display powered off, a processing device and other hardware modules in reduced power consumption modes, etc.). While the mobile device is in the low power state, one or more components (e.g., the wireless communication module 138) are disabled or throttled. In one embodiment, some of the components are completely powered off. Alternatively, the components may be placed into a reduced power stated in which one or more modules within the components may be powered off and/or in which the components are unable to perform all of their standard functionality.

For the sake of clarity, as used herein the terms "suspended" and "low power state" refer to separate and distinct states of the mobile device. The suspended state refers to a state in which the mobile device is unused but ready for use at a moment's notice. While the mobile device is in the standard suspended state, components such as a Wi-Fi module or wireless modem are typically powered on unless a user has expressly disabled these components. Accordingly, when a user begins using the mobile device that is initially in the suspended state, the Wi-Fi module, for example, may already have an established wireless connection to a Wi-Fi hotspot. However, one or more of these components is disabled during the low power state. If a user begins using the mobile device while the device is in the low power state, the unpowered or underpowered components may be reactivated, and may then perform initial operations such as connecting to a Wi-Fi access point. Accordingly, the low power state in general consumes less power than the suspended state, but it takes more time to transition out of the low power state than out of a standard suspended state.

In some embodiments, the mobile device may be in the low power state while suspended (e.g., to result in a low power suspended state) and may also be in the low power state while active (e.g., to result in a low powered active state). The term waking-up a mobile device as used herein means causing a component of the mobile device to transition from a suspended state to a fully active state. In some embodiments, the mobile device may be woken-up by an application in while remaining in the low power state (e.g., the mobile device may be woken-up by an application during a scheduled inactive period). Waking-up the mobile device may not transition the mobile device out of the low power state unless the wake-up is based on detected user activity. For example, if an application wakes up the mobile device without user input, then the mobile device may stay in the low power state while active.

The usage schedule 152 may be generated based on device usage patterns learned from activity information gathered by the mobile device 140. The usage schedule may include scheduled active periods for the mobile device and scheduled inactive periods for the mobile device. The scheduled active periods correspond to periods during which the mobile device 104 is predicted to be used and the scheduled inactive periods correspond to time periods during which the mobile device 104 is predicted to be unused.

In one embodiment, the time periods during which the mobile device is predicted to be used and unused are determined by computing a probabilities of usage at particular time periods based on determined usage patterns. One or more probability thresholds may then be applied. If during a given time period the probability of usage is above a threshold probability, then it is predicted that the mobile device will be used. If during a given time period the probability of usage is below the threshold probability, then it is predicted that the mobile device will be unused.

In one embodiment, the predicted use is predicted usage by a user (e.g., predicted user interaction in which a user may view a display, provide input, listen to audio, play a game, etc.). In another embodiment, the predicted use is automated use that does not involve user interaction. Such predicted automated use may include the device performing automatic operations such as communicating with a server or backend, taking sensor readings, performing additional operations locally on the device, and so on. Thus, the scheduled active periods are time periods during which particular functionality such as a network connection are predicted to be used by the device based on prior usage. By contrast, the scheduled inactive periods are time periods during which the particular functionality is predicted to be unused. The device state manager 135 may transition the mobile device 104 into the low power state during the scheduled inactive periods and may transition the mobile device 104 out of the low power state during the scheduled active periods. This may ensure that a battery of the mobile device is not unnecessarily drained by components that will most likely be unused during scheduled inactive periods.

Applications, an operating system, syndications, content sources that a user subscribes to, etc. may periodically send data such as new content, updates, and so forth to the mobile device 104. However, the mobile device 104 may be unable to receive such data or perform other scheduled operations while it is in the low power state during the scheduled inactive periods. Accordingly, in one embodiment the device state manager 135 injects additional (previously unscheduled) active periods into the usage schedule to cause the mobile device to transition out of the low power state and receive such data or perform one or more scheduled operations before a next scheduled active period. Thus, the mobile device 104 may be ready for use by the time the next scheduled active period occurs. Scheduled operations may include scheduled updates, scheduled synchronization operations, scheduled downloads, scheduled data transmissions, scheduled backup operations, and so forth. Any other scheduled operations may be also be identified.

In one embodiment, device state manager 135 determines the usage schedule 152 and the additional active periods to inject into the usage schedule 152. Alternatively, or additionally, device state manager 135 may rely on a device state service 180 running on server system 120 to determine the usage schedule 152 and/or the additional active periods. For example, device state manager 135 may send gathered activity information to server system 120, and device state service 180 may use the activity information to determine the usage schedule. The device state service 180 may have access to greater information and/or processing resources than the mobile device 104, and may apply more complex machine learning algorithms than the device state manager 135 to determine the usage schedule. The device state service 180 may then send the usage schedule 152 to the mobile device or may send individual instructions instructing the mobile device when to enter into or out of the low power state according to the determined usage schedule.

Device state service 180 may collect additional information from server systems 122 and computing devices 118, where the additional information may not originate from the mobile device 104. For example, a user of mobile device 104 may have a user account with the server system 120. That user account may be associated with the mobile device 104. However, the user may also perform activity associated with that user account from other computing devices 118, which may be other mobile devices or stationary devices (e.g., desktop computers, smart televisions, home entertainment systems, etc.). Device state service 180 may gather such additional information and use it for the computation of the usage schedule and/or for the computation of additional active periods. Additionally, the device state manager 180 may have access to information such as scheduled or unscheduled updates, scheduled or unscheduled synchronization events, and so forth. Device state service 180 may additionally use such information for the computation of the usage schedule 152 and/or the additional active periods. Device state service 180 may send an instruction to the mobile device 104 to inject an additional active period into the usage schedule 152 whether the usage schedule was determined by the mobile state manager 135 or the device state service 180.

Figure 2:
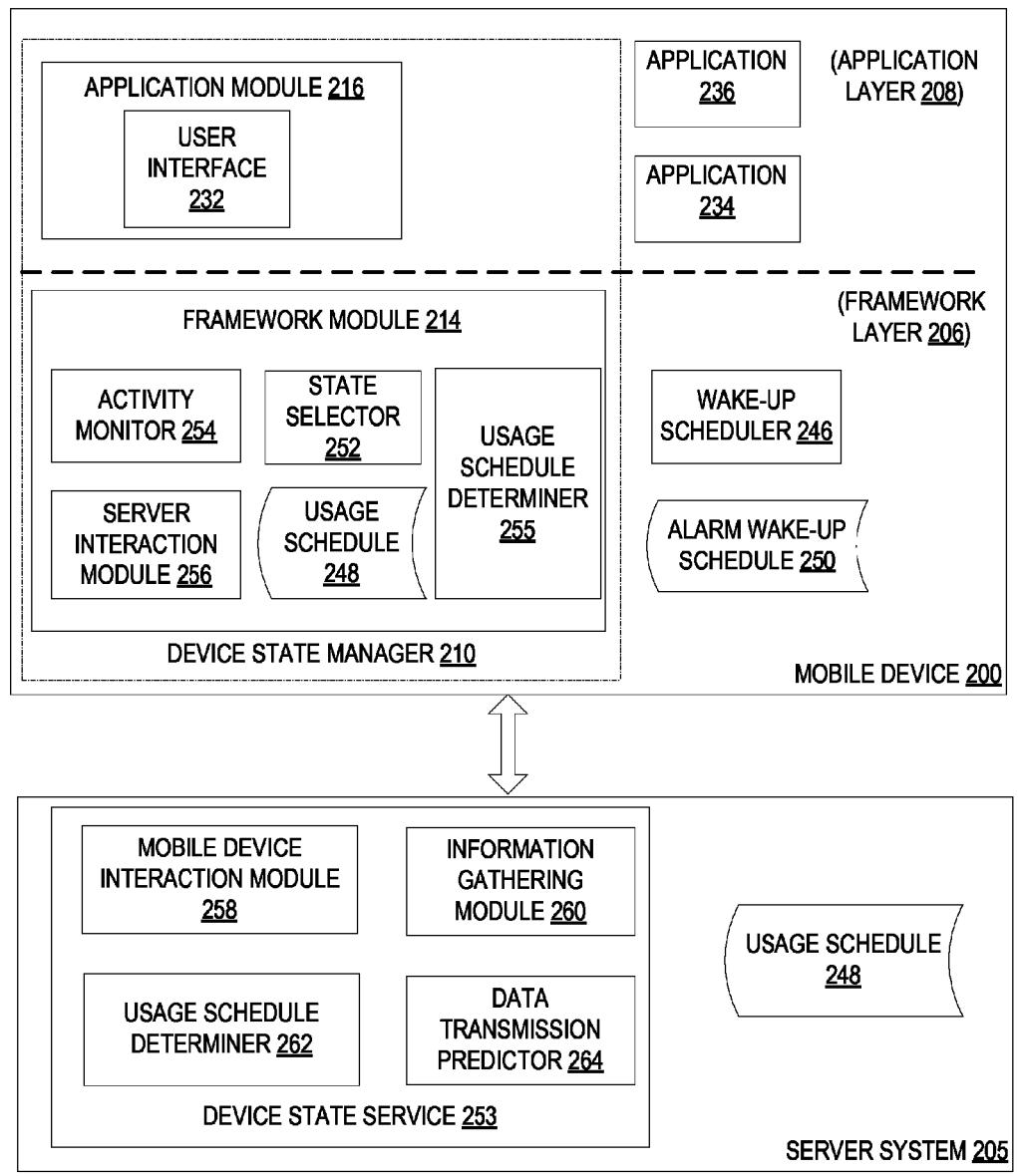
FIG. 2 is a block diagram of a logical view of a mobile device connected to a server system, in accordance with one embodiment.

FIG. 2 is a block diagram of a logical view of a mobile device 200 connected to a server system 205, in accordance with one embodiment. The mobile device 200 is logically divided into a kernel layer (not shown), a framework layer 206 and an application layer 208. The kernel layer is reserved for privileged processes, and provides access to operations that are not available at the framework layer 206 or application layer 208. The kernel layer also acts as an abstraction layer between hardware and the higher layers (e.g., the framework layer 206 and application layer 208). The framework layer 206 provides higher-level services to applications. The framework layer 206 includes one or more framework modules that enable system services and applications to interface with lower level libraries. Modules in the framework layer 206 may provide APIs for interfacing with native libraries such as a window manager, media codecs, graphics engines, and so on. Some example framework modules may include an activity manager that manages the activity lifecycle of applications, a resource manager, a wake-up scheduler 246, and so forth.

Most processes operate at the application layer 208. Applications 234, 236 that run at the application layer 208 may include standard applications that are automatically included in the mobile device and additional applications, which may be third party applications and/or other applications that are not pre-installed on the mobile device 200. Examples of applications (or apps) 234, 236 include a social network application (e.g., a Facebook® app, a Google+® app, a LinkedIn® app, etc.), an electronic mail (email) application (e.g., a Yahoo® Mail! app, a Gmail® app, an OS X® mail app, etc.), a calendar application, games, a newsreader application, and so on.

The mobile device 200 includes a device state manager 210, which may include components at one or more of the framework layer 206 and application layer 208. In the illustrated embodiment, the device state manager 210 includes a framework module 214 at the framework layer 206 and an application module 216 at the application layer 208.

In one embodiment, framework module 214 is a low level daemon that may interact with drivers and other processes running at the framework layer 206 and/or application layer 208. Framework module 214 may include an activity monitor 254, a state selector 252, a usage schedule determiner 255 and a server interaction module 256. Framework module 214 may also include or have access to a usage schedule 248.

Activity monitor 254 gathers activity information about the mobile device 200. The activity information indicates when a user actively uses the mobile device 200. Accordingly, activity information may be any metric that reflects how much and/or how often the mobile device is actually being used by a user. Activity monitor 254 monitors and logs events indicative of such user interaction. In one embodiment, activity monitor 254 identifies and logs time periods during which a display of the mobile device 200 is active. Activity monitor 254 may also identify and log time periods during which the mobile device 200 is subject to a wake lock. In the aggregate, the times during which wake locks are in place and the times during which the display is active should represent all time periods during which a user is using the mobile device 200.

In one embodiment, usage schedule determiner 255 uses the gathered activity information to determine the usage schedule 248 for the mobile device 200. Usage schedule determiner 255 may apply one or more machine learning techniques or algorithms to generate the usage schedule. Any type of machine learning technique may be used. Some examples of possible machine learning techniques include a support vector machine (SVM), a K-nearest neighbors algorithm, linear discriminant analysis, quadratic discriminant analysis, neural networks, and so on. The gathered activity information is used as an input for the machine learning algorithm, and the usage schedule 248 that includes scheduled active periods and scheduled inactive periods may be a generated output. The criteria for determining the scheduled active periods and the scheduled inactive periods may depend on the specific machine learning technique used. However, regardless of the machine learning technique that is applied, the criteria for scheduled active periods and for scheduled inactive periods will be based on when a user uses the mobile device.

In one embodiment, the usage schedule determiner 255 applies a custom K-nearest neighbors algorithm to determine the usage schedule 248. Usage schedule determiner 255 may first partition time into individual days, and determine activity patterns for each day. To determine a usage schedule for a particular day, usage schedule determiner 255 then computes a distance between the particular day and other days. For days having a computed distance that is less than a threshold, these days will be taken into consideration for the determination of the particular day's usage schedule. For example, the data from days with similar usage patterns may be aggregated with the data for the particular day, with or without application of a weighting factor. For example, usage schedule determiner 255 may determine that the usage patterns for one or more Mondays, Tuesdays and Wednesdays are similar, but not exactly alike. Accordingly, usage schedule determiner 255 may take into account the activity information of one or more Mondays, Tuesdays and Wednesdays when computing the usage schedule 248 for a particular Monday.

In one embodiment, usage schedule determiner 255 computes probabilities of usage at particular time periods using the machine learning algorithm. One or more probability thresholds may then be determined using the machine learning algorithm and then applied. Alternatively, the probability thresholds may be set by a user. If the probability of usage is above a threshold probability for a given time period, then a scheduled active period may be determined for that time period. If the probability of usage is below the threshold probability for a given time period, then a scheduled inactive period may be determined for that time period.

The usage schedule 248 may be a data structure such as a table, a database, a spreadsheet, or other data structure containing information identifying scheduled active periods and scheduled inactive periods. As mentioned previously, the scheduled active periods correspond to time periods during which there is a high probability that the mobile device will be used by a user. The scheduled inactive periods correspond to time periods during which there is a low probability that the user device will be used. In one embodiment, the usage schedule determiner 255 periodically stores the usage schedule 248 to non-volatile storage so that it can be used on subsequent boot-ups.

In one embodiment, usage schedule determiner 255 applies a minimum time period for scheduled inactive periods. In such an embodiment, no scheduled inactive period would have a time period that is shorter than the minimum time period. If a scheduled inactive period would have a time period that is less than the minimum time period, then that period of time may be included in an adjacent scheduled active time period. This may ensure that the mobile device does not toggle frequently into and out of the low power state. For example, the minimum scheduled inactive period may be 1 hour, 2 hours, 30 minutes, or another amount of time.

State selector 252 selects a current state to apply to the mobile device. State selector 252 may be configured to select whether to apply a low power state or a standard state based on the usage schedule 248. For example, state selector 252 may be configured to transition the mobile device 200 to a low power state during scheduled inactive periods and to transition the mobile device out of the low power state during scheduled and additional active periods. While the mobile device 200 is in the low power state, one or more components may be powered off, disabled and/or throttled. For example, wireless communication modules, GPS receivers, and other components that consume large amounts of power may be powered off. Additionally, components such as a processing device may be throttled to reduce power consumption. Operations that consume large amounts of power such as wake-up alarms may also be restricted.

In one embodiment, drivers for such components monitor the present state of the mobile device 200, and power off their associated hardware components responsive to determining that the mobile device is in a low power state. For example, a Wi-Fi module driver may power off a Wi-Fi module responsive to the mobile device 200 entering the low power state. Alternatively, the state selector 252 may determine which components should be shut off and instruct the appropriate drivers to power down those components.

When the state selector 252 places the mobile device 200 into the low power state, the state selector 252 may call on the wake-up scheduler 246 to schedule a wake-up alarm at a future time corresponding to the start of a scheduled active period. Wake-up scheduler 246 may insert a wake-up alarm entry onto an alarm wake-up schedule 250 for the device state manager 210. When the scheduled time arrives, the alarm wake-up may cause the mobile device to wake-up, at which time the state selector 252 may transition the mobile device out of the low power state.

In one embodiment, all wireless communication modules (e.g., Wi-Fi module, wireless modem, wireless area network (WAN) module, etc.) may be disabled while the mobile device 200 is in the low power state. Accordingly, there may be no network connectivity while the mobile device 200 is in the low power state. Many applications frequently or periodically wake-up the mobile device (either via alarm wake-ups or via network wake-ups in which a received network packet causes the mobile device to wake-up) to check for new data from a remote service. However, no network connections may be maintained while the mobile device 200 is in the low power state. Accordingly, applications may not schedule wake-up alarms while the mobile device 200 is in the low power state, and network wake-ups may not be possible while the mobile device is in the low power state. Additionally, in one embodiment applications are prohibited from using wake-up alarms while the mobile device is in the low power state. Thus, the battery drain during the low power state may be considerably lower than a battery drain during a standard suspended state.

Though the state selector 252 is described herein as selecting one of two states (standard state or low power state), it should be understood that additional states may also be implemented. For example, usage schedule 248 may include scheduled active periods, scheduled inactive periods, and scheduled intermediate activity periods. An intermediate power state may be applied during the intermediate activity periods, and a low power state may be applied during the inactive periods. More power saving settings or options may be implemented for the low power state than for the intermediate power state. In example, the usage schedule determiner 255 may determine that a user does not use a particular component (e.g., a GPS receiver) of the mobile device 200 during certain time periods, and may determine a schedule for intermediate activity periods based on such a determination. During these periods, state selector 252 may transition the mobile device into the intermediate power state, which may cause the GPS receiver to be powered off. The GPS receiver may or may not also be turned off during the low power state in addition to other hardware components such as a Wi-Fi module.

The application module 216 of the device state manager 210 may include a user interface. The user interface 232 may be a graphical user interface (GUI) or command line user interface. User interface 232 may display usage level statistics/patterns, the usage schedule 248, a list of components that will be shut off during scheduled inactive periods, and/or other information. The user interface 232 may also enable a user to easily manually adjust the usage schedule and/or which components are active or inactive during different device states. The user interface 232 may also enable a user to manually insert one time or repeating additional active periods into the usage schedule.

In some embodiments, the usage schedule determiner 255 determines a usage schedule for the mobile device 200 without any input from a server system. Alternatively, a server interaction module 256 of the device state manager 256 may offload the computation of the usage schedule 248 to a device state service 253 running on a server system 205. In particular, the server interaction module 256 may send activity information of the mobile device 200 to server system 205, device state service 253 may compute the usage schedule, and may then send the determined usage schedule and/or instructions for implementing the determined usage schedule to server interaction module 256.

In one embodiment, device state service 253 is a cloud service that helps mobile devices to accurately determine usage schedules and to implement those usage schedules in a manner that has minimal or no user impact (other than a prolonged battery life). In one embodiment, device state service 253 includes a mobile device interaction module 258, an information gathering module 260, a usage schedule determiner 262 and a data transmission predictor 264.

Mobile device interaction module 258 is responsible for communicating with one or more mobile devices. Mobile device interaction module 258 may receive activity information from mobile devices 200. Mobile device interaction module 258 may additionally send one or both of usage schedules and instructions for implementing usage schedules to mobile devices. For example, mobile device interaction module 258 may send instructions to enter into a low power state at a designated time corresponding to a scheduled inactive period, and may send instructions to exit the low power state at another designated time corresponding to a scheduled active period. Mobile device interaction module 258 may also send a usage schedule to the mobile device 200, the usage schedule constituting instructions to implement particular states during scheduled inactive and scheduled active periods. The mobile device 200 may accordingly determine when to transition into and out of the low power state based on the provided usage schedule. The mobile device interaction module 258 may also send instructions to inject additional active periods into the usage schedule (discussed in greater detail below).

Usage schedule determiner 262 may perform all of the operations previously discussed with reference to usage schedule determiner 255. However, usage schedule determiner 262 may have far greater resources available than usage schedule determiner 255. Accordingly, usage schedule determiner 262 may apply more complex or processor intensive machine learning algorithms to determine an appropriate usage schedule for mobile device 200.

In one embodiment, usage schedule determiner 262 applies multiple different machine learning algorithms to determine different versions of a usage schedule for the mobile device. Usage schedule determiner 262 may then select and apply one of the versions of the usage schedule to the mobile device. The usage schedule determiner 262 may monitor the accuracy of the applied version of the usage schedule (e.g., by determining a hit-miss ratio for the usage schedule). Usage schedule determiner 262 may additionally monitor the accuracy of the unapplied other versions of the usage schedule. If any of the other versions turns out to be more accurate than the applied version, then usage schedule determiner 262 may switch to usage of the other more accurate usage schedule. This may cause mobile device interaction module 258 to transmit new instructions and/or the new usage schedule to the mobile device 200.

Usage schedule determiner 262 may apply usage schedule determination policies of various levels of aggressiveness to determine scheduled inactive periods. A non-aggressive policy may apply criteria that include low usage thresholds and/or large or moderate buffers around detected device usage activity to determine scheduled inactive periods. By contrast, an aggressive policy might apply criteria that include high usage thresholds and/or no buffers to determine scheduled inactive periods.

In an example, assume that activity information for the mobile device 200 shows that Tuesday, Wednesday and Friday have similar activity patterns. Activity information shows that a user typically stops using the mobile device at 8 PM on Tuesdays, Wednesdays and Fridays. However, the mobile device was briefly used for 1 minute at 9 PM on Tuesday. There is no other recorded device usage after 8 PM for any of the days. A non-aggressive policy might apply criteria stating that any detected usage should result in a scheduled active period with a buffer. Such a non-aggressive policy might cause scheduled active periods for Tuesday, Wednesday and Friday to end one hour after the last detected use (e.g., at 10:01 PM). A slightly more aggressive policy might state that any detected usage should result in a scheduled active period, but that less than a threshold level of usage does not cause a buffer to be created. Such a policy might not apply the one hour window, and may cause the scheduled active period to end at 9:01 PM, for example. An even more aggressive policy might state that at least a threshold amount of activity should be detected to create a scheduled active period. Such an aggressive policy might disregard the 9 PM usage, and might cause the scheduled active period to terminate at 8 PM.

In one embodiment, usage schedule determiner 262 applies a policy of a particular level of aggressiveness to determine the scheduled inactive periods in the usage schedule. Usage schedule determiner 262 may start with a non-aggressive policy, an aggressive policy, or an intermediate policy. Usage schedule determiner 262 may then receive updated activity information from the mobile device 200, and may compare the updated activity information to the usage schedule to determine a hit-miss ratio. To determine the hit-miss ratio, the usage schedule determiner identifies one or more hits for the usage schedule, wherein a hit is identified for a scheduled inactive period where no user activity has been detected. The usage schedule determiner 262 additionally identifies one or more misses for the usage schedule, wherein a miss is identified for a scheduled inactive period where user activity has been detected. The hit-miss ratio is then computed by taking a ratio of the number of hits to the number of misses. If there are too many misses (e.g., a hit miss ratio below a first threshold), then the policies for generating the usage schedule may be adjusted to be less aggressive, and the usage schedule may be recomputed. If there have been no misses or very few misses (e.g., a hit-miss ratio above a second threshold), then the policies for generating the usage schedule may be adjusted to be more aggressive, and the usage schedule may be recomputed.

In addition to having access to greater resources than usage schedule determiner 255, usage schedule determiner 262 may also have access to more information. In one embodiment, information gathering module 260 gathers such additional information and provides it to usage schedule determiner 262 for computation of the usage schedule 248. For example, information gathering module 260 may gather information of other devices used by a user of the mobile device 200. Additionally, or alternatively, information gathering module 260 may gather activity information for similar devices to mobile device 200 that are used by other users having similar usage patterns to those shown for mobile device 200. Some or all of the additional gathered information may be used as inputs to a machine learning system of usage schedule determiner 262.

In one example, the mobile device may be associated with a user account that is known to server system 205. Information gathering module 260 may detect activity associated with the user account from other computing devices. Based on such activity, usage schedule determiner 262 may determine that the user is likely to use the mobile device 200 or unlikely to use the mobile device 200, and may update or determine a usage schedule for the mobile device accordingly.

In an example, the mobile device 200 may be an ebook reader. Information gathering module 260 may detect that a user frequently browses for electronic books from another computing device at particular times, and that that such behavior occasionally results in the purchase of an ebook. Accordingly, usage schedule determiner 262 may make sure that the mobile device 200 is active at these times to receive the purchased books.

In another example, the mobile device may be an ebook reader or tablet computer. The mobile device may be associated with a user account, and a smart television may also be associated with the user account. Information gathering module 260 may detect that a user is presently watching the smart television, and that the user is not presently using the mobile device 200. Based on previous information regarding user activity on the mobile device 200 while the user was watching the smart television, usage schedule determiner 262 may determine that the mobile device should be in an inactive period or in an active period. Usage schedule determiner may then insert an additional active period or an additional inactive period into the usage schedule in accordance with the determination. Accordingly, user activity on one device can be used to insert additional active and/or inactive periods into other devices associated with the same user account.

Other types of information that information gathering module 260 may gather include scheduled or predicted push notifications from messaging services such as the Amazon device messaging framework (ADM). For example, ADM occasionally generates notifications and pushes these notifications to devices. Based on such information, the usage schedule determiner 262 may identify when notifications will be pushed to devices, and what user interaction such pushes usually trigger, and can plan accordingly.

In an example, assume mobile device 200 has a turn based game installed, and a server regularly pushes updates to the game at 7 AM. Assume also that the updates regularly result in the device being used shortly after 7 AM. Usage schedule determiner 262 may use data about such updates collected by information gathering module 260 to assure that the mobile device 200 will be awake to receive the game update. Accordingly, usage schedule determiner 262 may leverage ADM traffic history (for example) to determine that even though the user is not using the mobile device 200 at particular time periods, updates are typically sent during these periods, and these updates result in later user interaction.

In one embodiment, data transmission predictor 264 predicts data that would be sent to mobile device 200 during time periods in which the mobile device is in a low power state as well as data that might be sent to the mobile device while it is not in the low power state (e.g., is in a standard active or suspended state). Such data transfer predictions may be made based on information gathered by information gathering module 260. Data transmission predictor 264 then applies one or more criteria to the gathered information to determine an additional active period to be injected into the usage schedule 248 of mobile device 200. Notably, the criteria and information used to determine the additional active periods may be separate and distinct from the data and/or criteria used to generate the usage schedule 248.

Note that embodiments are discussed herein with regards to injecting or adding additional active periods into initial usage schedules based on additional information and/or criteria that is different from the information and/or criteria used to develop the usage schedule. It should be understood that the same principles may be applied to inject additional inactive periods into the initial usage schedule. For example, if additional information shows that there is a low probability that a user will be using the mobile device for a certain period of time that corresponds to a presently scheduled active period, usage schedule determiner 262 may generate an additional inactive period and cause that additional inactive period to be inserted into the initial usage schedule.

One example of gathered information that may be used to predict future data transfers is the above mentioned regular data pushes. For example, data pushed to a mobile device by ADM may be recorded over time, and may be used by data transmission predictor 264 to identify patterns in data pushes.

Information gathering module 260 may additionally gather information regarding application updates, operating system updates, firmware updates, driver updates, and/or other updates (referred to generally as over the air (OTA) updates). Such updates may be based on past update records and/or may be based on scheduled future updates. Information gathering module 260 may additionally gather information regarding synchronization patterns for various applications installed on the mobile device 200. For example, information gathering module 260 may gather information showing that a first application performs synchronization operations every hour, and that a second application performs synchronization operations every other hour. Information gathering module 260 may additionally gather information identifying scheduled backup events for the mobile device 200.

Information gathering module 260 may additionally receive and/or record information identifying previous data transfer attempts to the mobile device that failed due to the mobile device being in a low power state during a scheduled inactive period. This information may be used to determine that a similar future data transfer attempt is likely, and thus to determine an additional active period to insert into an initial usage schedule.

Data transmission predictor 264 uses the various data gathered by information gathering module 260 (e.g., historic and/or scheduled future OTA updates, historic and/or scheduled message pushes by ADM or other messaging services, scheduled backup events and/or historic backup events, scheduled and/or historic synchronization events, etc.) to predict when future data transfers will occur. Data transmission predictor 264 additionally uses the gathered information to predict an amount of time that will be used to complete each of the predicted data transfer events. The predicted time to complete a data transfer may be estimated based on gathered information regarding the amount of data that is to be transmitted, the nature of the data to be transmitted, a current and/or usual bandwidth of the mobile device and/or historic amounts of time that were used to complete past data transfers.

Data transmission predictor 264 may identify all of the predicted data transfers that are predicted for a next scheduled inactive period of the mobile device 200. Data transfer predictor 264 may then aggregate the predicted amounts of time to complete each of the predicted data transfers. Based on the total amount of time to complete the data transfers, data transmission predictor 264 determines an appropriate timing for an additional active period. Data transmission predictor 264 then generates an instruction to inject the determined additional active period into the usage schedule of the mobile device 200, which mobile device interaction module 258 may send to mobile device 200. In an example, data transmission predictor 264 may identify which applications are installed on the mobile device 200, identify which applications have updates, estimate how much time will be used to download and install each update, and then set a timing for an additional active period accordingly.

In one embodiment, rather than performing the above described operations to determine when to inject an additional active period into a usage schedule, data transmission predictor 264 causes the device state manager 210 to inject an additional active period a fixed amount of time (e.g., about 30-45 minutes) before a next scheduled active period is to occur. Data transmission predictor 264 may then determine whether all data transfers (e.g., updates, synchronization events, backups, etc.) completed before a next scheduled active period. If the data transfers did not complete prior to the next scheduled active period, then data transmission predictor 264 may increase the fixed amount of time for future additional active periods. If the data transfers completed prior to the next scheduled active period, then an amount of idle time between completion of the data transfers and the scheduled active period may be measured. This value may then be used to reduce the fixed time used for future additional active periods.

In one embodiment, data transmission predictor 264 injects a brief additional active period into the usage schedule on a periodic basis. For example, data transmission predictor 264 may cause the device state manager to inject a 1 minute additional active period every hour. During the 1 minute additional active period, one or more applications may initiate data transfers such as synchronization operations, updates, and so forth. If any of the data transfers will take more than 1 minute to complete, the applications may place a wake lock that will be held until the transfer is complete. The state selector 252 will wait until there are no active wake locks to transfer the mobile device 200 back into the low power state.

In one embodiment, data transmission predictor 264 identifies one or more scheduled operations that can only be performed if the mobile device is not in the low power state. Additional active periods may be determined and added to an initial usage schedule based on the scheduled operations. Examples of such operations include backup operations, synchronization operations, download operations, upload operations, and so forth.

Some additional active period computation techniques that do not rely on data unavailable to the mobile device 200 may be performed on the mobile device. In one embodiment, framework module 214 includes a data transmission predictor (not shown) that determines additional active periods to inject into the usage schedule using such techniques, such as those described above.

In one embodiment, responsive to receiving an instruction to inject an additional active period into the usage schedule 248, device state manager 210 updates a usage schedule by adding one or more entries for the additional active period. The received instruction may indicate that the additional active period is to be recurring or that it is a one-time additional active period. Based on the received instruction, device state manager 210 may additionally or alternatively add a wake-up alarm to the alarm wake-up schedule 250. The wake-up alarm may wake the mobile device 200 at a scheduled time, at which point the state selector 252 may transition the mobile device 200 out of the low power state.

In an alternative embodiment, responsive to an instruction to inject an additional active period into the usage schedule 248, usage schedule determiner 255 and/or usage schedule determiner 262 uses the additional active period as an input into the machine learning system. Usage schedule determiner 255, 262 may then re-compute the usage schedule using the additional active period as an additional input. Depending on the other data and the machine learning algorithm used, the additional active period may cause a new scheduled active period to be added to the usage schedule, may cause a timing of one or more scheduled active periods and/or inactive periods to be changed, or may have no effect.

Figure 3:
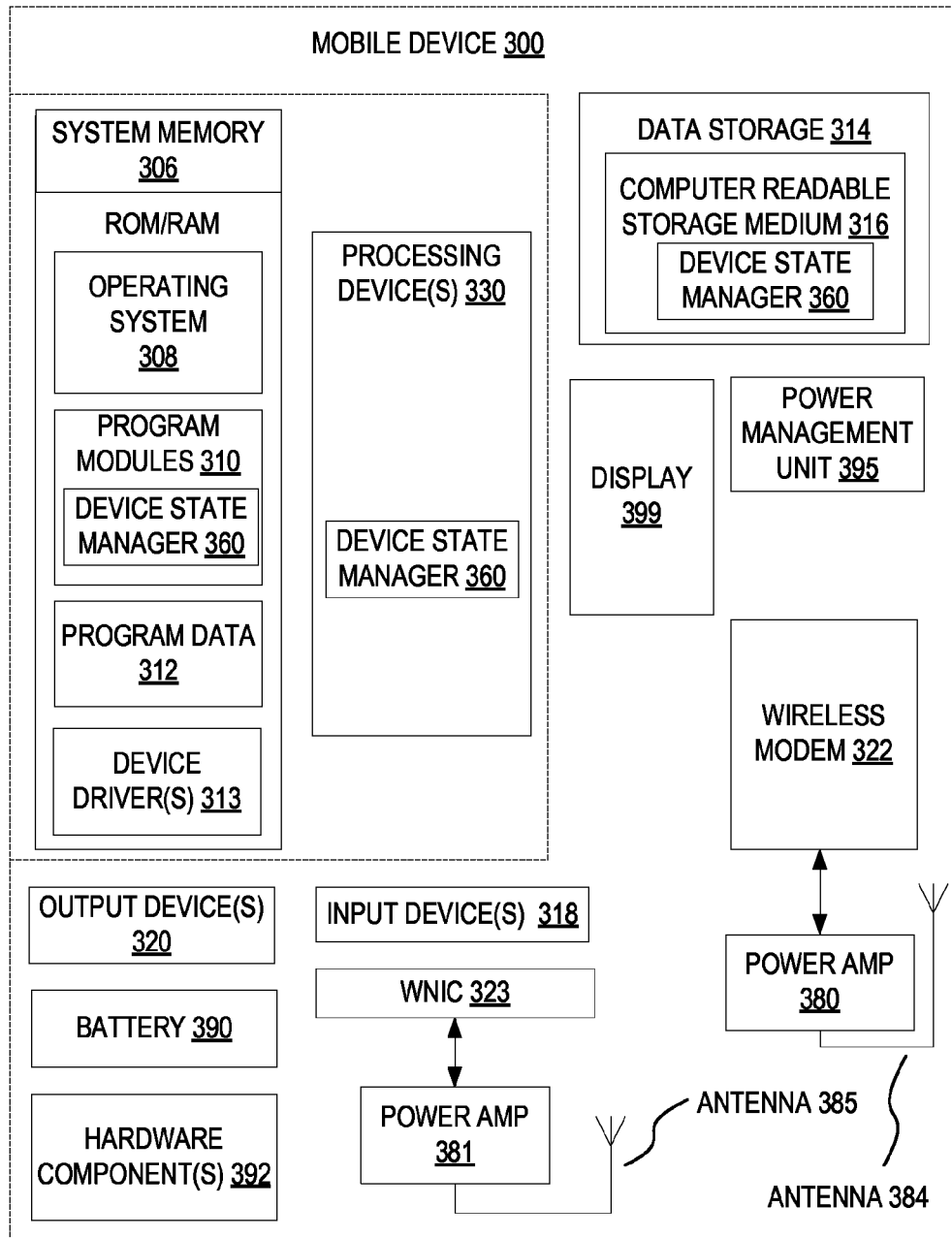
FIG. 3 is a block diagram illustrating an example mobile device with a device state manager, in accordance with one embodiment.

FIG. 3 is a block diagram illustrating an example mobile device 300 that includes a device state manager 360. The mobile device 300 may correspond to the mobile device 104 of FIG. 1 and/or mobile device 200 of FIG. 2, and may be any type of mobile computing device such as an electronic book reader, a personal digital assistant (PDA), a mobile phone, a laptop computer, a portable media player, a tablet computer, a camera, a video camera, a remote control, an automobile, a wearable device (e.g., smart watch, body sensor, glasses, etc.), a barcode scanner, a portable speaker system, a netbook, a computing pad, or other battery powered device.

The mobile device 300 includes one or more processing devices 330. Each processing device may be a general purpose processing device (e.g., a microprocessor, central processing unit, or the like) or a special purpose processing device (e.g., an application specific integrated circuit (ASIC), a field programmable gate array (FPGA), a digital signal processor (DSP), network processor, or the like). The mobile device 300 also includes system memory 306, which may correspond to any combination of volatile and/or non-volatile storage mechanisms. The system memory 306 stores information which provides an operating system component 308, various program modules 310 such as for a device manager 360, program data 312, device drivers 313, and/or other components. The mobile device 300 performs functions by using the processing device(s) 330 to execute instructions provided by the system memory 306.

The mobile device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the device manager 360 may reside, completely or at least partially, within the computer readable storage medium 316, system memory 306 and/or within the processing device(s) 330 during execution thereof by the mobile device 300, the system memory 306 and the processing device(s) 330 also constituting computer-readable media. The mobile device 300 may also include one or more input devices 318 (keyboard, mouse device, specialized selection keys, touchpad, touch screen, etc.) and one or more output devices 320 (displays, printers, audio output mechanisms, etc.).

Mobile device 300 may also include a battery 390 that provides a finite amount of power. The battery 390 may provide a consistent voltage and/or amperage to components of the mobile device 200 until the battery reaches a drained state at which the battery 390 can no longer provide the voltage and/or amperage. When the battery 390 reaches this state, the mobile device may be suspended and/or turned off.

The mobile device 300 may further include a wireless modem 322 to allow the mobile device 300 to communicate via a wireless network (e.g., such as provided by the wireless communication systems) with other computing devices, such as remote computers, the server systems, and so forth. The wireless modem 322 may allow the mobile device 300 to handle both voice and/or non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), long term evolution (LTE), worldwide interoperability for microwave access (WIMAX), etc. The wireless modem 322 may generate signals and send these signals to power amplifier (amp) 380 for amplification, after which they are wirelessly transmitted via antenna 384. In addition to sending data, antenna 384 may also receive data (e.g., network packets), which is sent to wireless modem 322.

The mobile device 300 may further include a wireless network interface controller (WNIC) 323 to allow the mobile device 300 to communicate via a wireless network (e.g., such as provided by the wireless communication systems) with other computing devices, such as remote computers, the server systems, and so forth. The WNIC 323 may be a Wi-Fi NIC, a Bluetooth NIC, a Zigbee NIC, or other wireless NIC.

The WNIC 323 may generate signals and send these signals to power amplifier (amp) 381 for amplification, after which they are wirelessly transmitted via antenna 385. In addition to sending data, antenna 385 may also receive data (e.g., network packets), which is sent to WNIC 323. In one embodiment, the wireless modem 322, the WNIC 323 and the processing device(s) 330 are each discreet devices (e.g., each discreet integrated circuits). Alternatively, one or more of the wireless modem 322, WNIC 323 and processing devices 330 may be logics of a single integrated circuit.

In one embodiment, the mobile device 300 includes a power management unit 395. The power management unit 395 is hardware (e.g., a microcontroller) that governs power functions of the mobile device 300. The power management unit may include a processing device, firmware, software, memory, input/outputs, timers, analog to digital converters, and/or other components. The power management unit 395 may monitor power connections and battery charge, charge the battery 390 when appropriate, control power to other hardware components (e.g., to hardware components 392, wireless modem 322, WNIC 323, system memory 306, data storage 314, and so on), shut down components and/or perform other operations. In one embodiment, the device state manager 360 communicates with the power management unit 395 to shut down and/or power on hardware components during a low power state. In one embodiment, the device state manager 360 and/or at least one module of the device state manager 360 runs on the power management unit 395.

Mobile device 300 may additionally include one or more additional hardware components 392, such as a light sensor, hardware accelerators (e.g., audio codecs, graphics processors, etc.), a touch sensor, a proximity sensor, an accelerometer, a gyroscope, and so forth.

Figure 4:
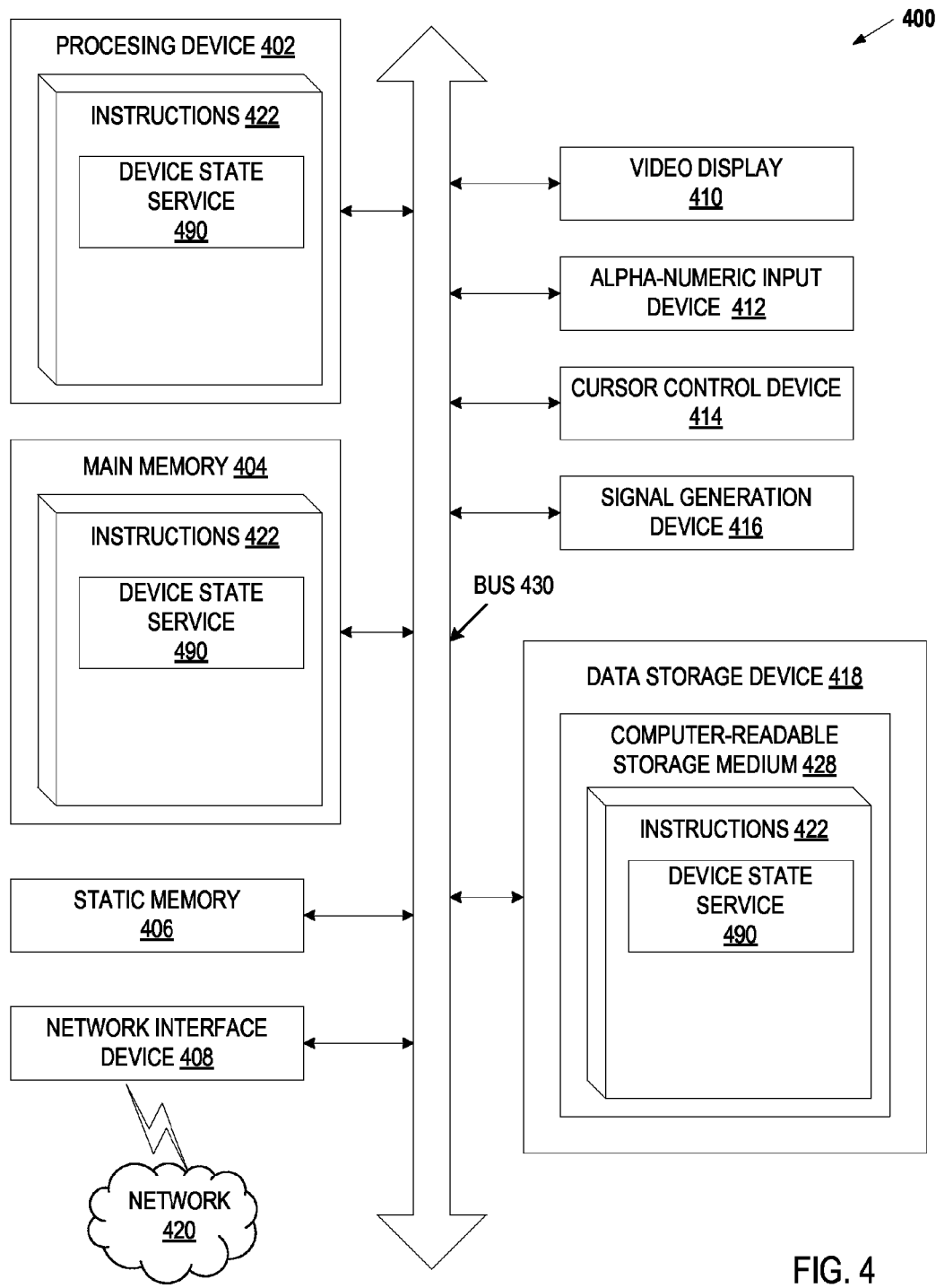
FIG. 4 is a block diagram illustrating server computing device with a device state service, in accordance with one embodiment.

FIG. 4 is a block diagram illustrating a server computing device 400 with a device state service 490, in accordance with one embodiment. The server computing device 400 may be connected (e.g., networked) to other machines in a LAN, an intranet, an extranet, and/or the Internet. The server computing device 490 may be a personal computer (PC), a tablet PC, a set-top box (STB), a web appliance, a rackmount server, a network router, a switch or bridge, or any machine capable of executing a set of instructions (sequential or otherwise) that specify actions to be taken by that machine. Further, while a single machine is illustrated, the server computing device 490 shall also be taken to include any collection of machines that individually or jointly execute a set (or multiple sets) of instructions to perform any one or more of the methodologies discussed herein. For example, the server computing device 400 may be one or more devices in a server system. In one embodiment, the server computing device 400 is one node of a cluster that provides a cloud service such as Amazon's® elastic compute cloud (ECM), Amazon web services (AWS®), or other cloud service.

The server computing device 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The server computing device 400 may further include a network interface device 408. The server computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and/or a signal generation device 416 (e.g., a speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processing device 402 during execution thereof by the server computing device 400, the main memory 404 and the processing device 402 also constituting machine-readable storage media.

In one implementation, the instructions 422 include instructions for a device state service 490 (e.g., device state service 253 of FIG. 2) and/or a software library containing methods that call modules in a device state service. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium other than a carrier wave that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Figure 5:
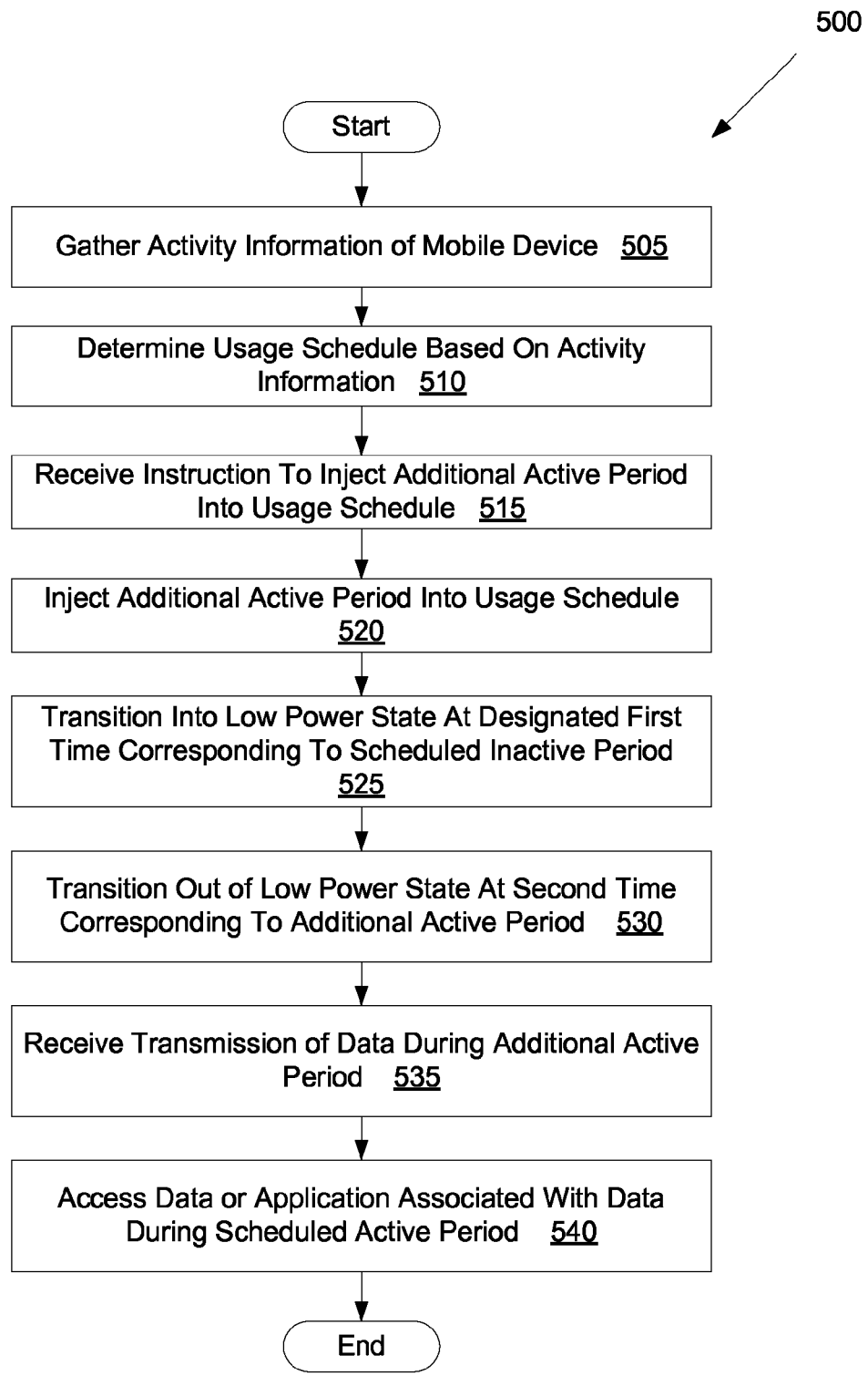
FIG. 5 is a flow diagram of an embodiment for a method of injecting an additional active period into a usage schedule of a mobile device.
Figure 6:
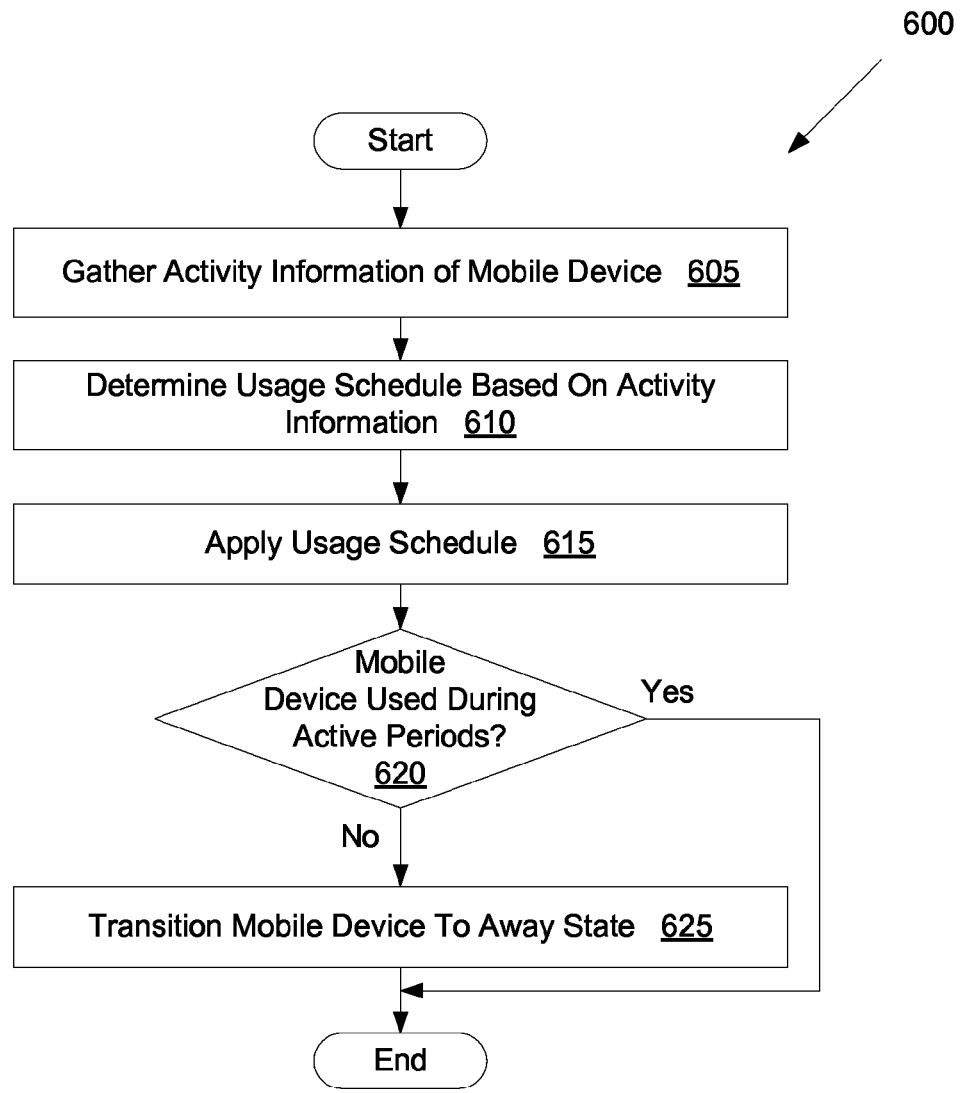
FIG. 6 is a flow diagram of an embodiment for a method of placing a mobile device into an away state.

FIGS. 5-6 are flow diagrams of various embodiments of methods performed by a mobile device or server system to conserve battery life. The methods are performed by processing logic that may include hardware (circuitry, dedicated logic, etc.), software (such as is run on a general purpose computer system or a dedicated machine), firmware, or some combination thereof. In one implementation, the methods may be performed by mobile device 104 of FIG. 1, mobile device 200 of FIG. 2 and/or mobile device 300 of FIG. 3.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 5 is a flow diagram of an embodiment for a method 500 of injecting an additional active period into a usage schedule of a mobile device. At block 505 of method 500, processing logic gathers activity information of a mobile device. At block 510, processing logic determines a usage schedule based on the activity information. The usage schedule may be determined using one or more first criteria that are associated with device activity patterns. The usage schedule includes one or more scheduled active periods and one or more scheduled inactive periods.

At block 515, processing logic receives an instruction to inject an additional active period into the usage schedule. Alternatively, processing logic may use one or more second criteria to determine the additional active period to inject into the usage schedule. At block 520, processing logic injects the additional active period into the usage schedule. This may include updating a data structure that represents the usage schedule and/or adding an entry to an alarm wake-up schedule. The added entry to the alarm wake-up schedule may cause the mobile device to wake-up at a specified time corresponding to the additional active period.

At block 525, processing logic transitions into a low power state at a designated first time corresponding to a scheduled inactive period. At block 530, processing logic then later transitions the mobile device out of the low power state at a designated second time corresponding to the additional active period.

At block 535, processing logic receives transmission of data and/or performs another scheduled operation during the additional active period. Preferably the data transmission and/or other operation completes prior to a subsequent scheduled active period. At block 540, processing logic then accesses the data that was received during the additional active period. Alternatively, if the data was an application update, processing logic may execute an application that was updated (e.g., an application associated with the data) during the additional active period.

FIG. 6 is a flow diagram of an embodiment for a method 600 of placing a mobile device into an away state. At block 605 of method 600, processing logic gathers activity information of a mobile device. At block 610, processing logic determines a usage schedule for the mobile device based on the activity information. At block 615, processing logic applies the usage schedule (e.g., transitions the mobile device into a low power state during scheduled inactive periods and out of the low power state during scheduled active periods).

At block 620, processing logic determines whether the mobile device has been used by a user during one or more active periods. A determination that the mobile device has not been used may be made based on absence of user input signals. For example, if no user input signals were received (e.g., from a touch screen, keyboard, buttons, etc.), then processing logic may determine that the device was not used during the active periods. Other information that may be analyzed to determine that the mobile device was not used during the active periods includes display state, wake locks and/or sensor data gathered during the active periods. For example, if the screen remained off during the active periods and/or there were no wake locks issued during the active periods, then processing logic may determine that the mobile device was not used. Additionally or alternatively, if one or more sensors of the mobile device such as an accelerometer or proximity sensor did not detect motion and/or a user proximity during the active periods, then processing logic may determine that the mobile device was unused during the active periods. If the mobile device was not used during a threshold number of sequential scheduled active periods, it may be determined that the user is away. For example, the user may go on vacation and leave the mobile device at home. If the mobile device has not been used for the threshold number of scheduled active periods, the method continues to block 625, and processing logic transitions the mobile device into an away state.

While the mobile device is in the away state, processing logic treats all scheduled active periods and scheduled inactive periods as scheduled inactive periods. Additionally, processing logic may prohibit additional active periods while the mobile device is in the away state. The mobile device remains in the away state until user interaction is detected. Responsive to detection of user interaction, processing logic may transition the mobile device out of the away state, and thus resume applying the usage schedule. Thus, the battery life of the mobile device may be maximized while a user is away. In one embodiment, processing logic automatically shuts the mobile device completely off if the mobile device remains in the away state for a threshold amount of time (e.g., for 2 days, for 3 days, 1 week, etc.).

FIGS. 7-12 are flow diagrams of various embodiments of methods related to determining usage schedules for mobile devices and injecting additional active periods into the usage schedules. The methods are performed by processing logic that may include hardware (circuitry, dedicated logic, etc.), software (such as is run on a general purpose computer system or a dedicated machine), firmware, or some combination thereof. In one implementation, the methods may be performed by a server system (e.g., by a cloud service provided by a server system). Example server systems that may perform the methods of FIGS. 7-12 include server system 120 of FIG. 1, server system 205 of FIG. 2, and server computing device 400 of FIG. 4. Various methods of FIGS. 7-12 may additionally or alternatively be performed by mobile devices.

Figure 7:
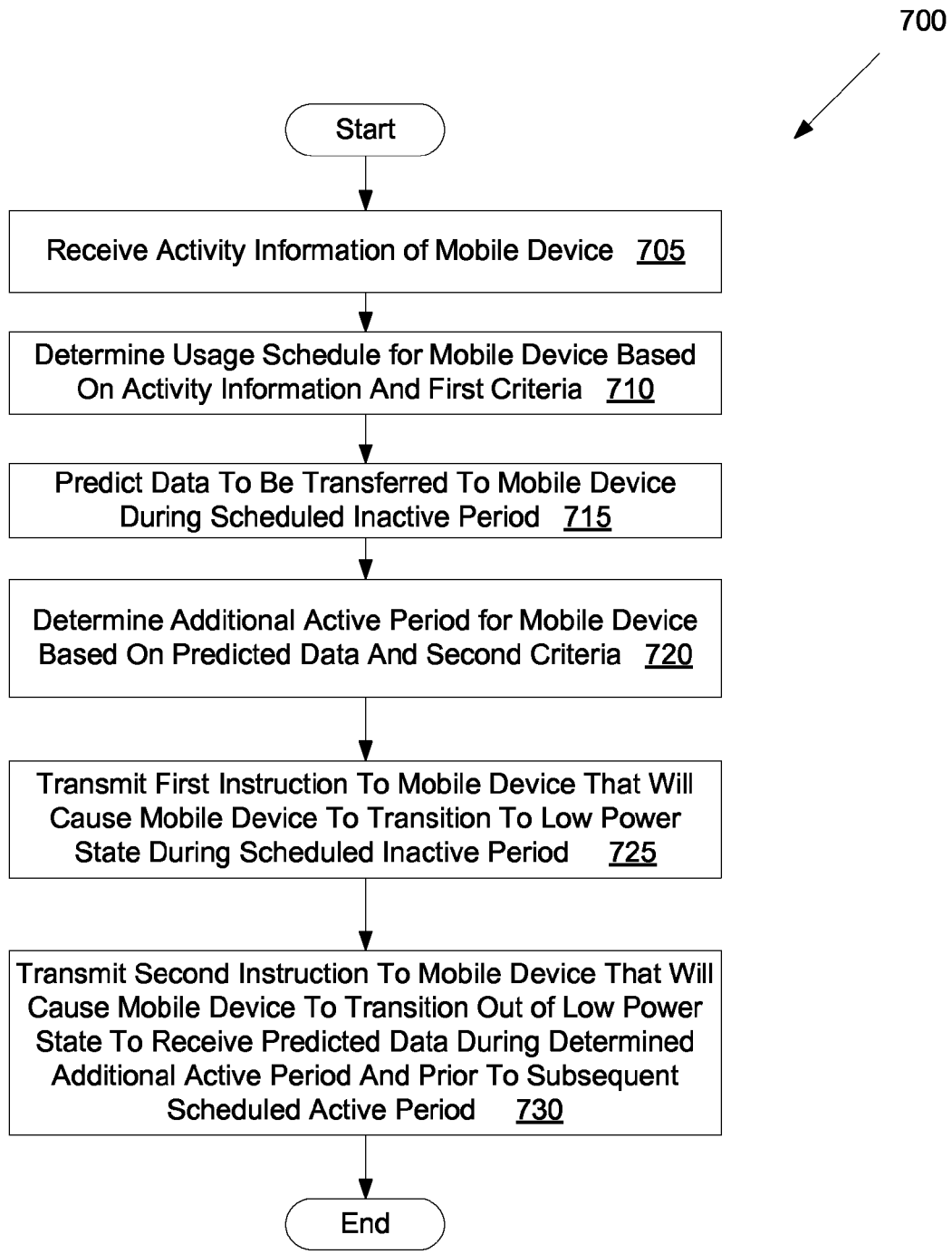
FIG. 7 is a flow diagram of an embodiment for a method of determining a usage schedule and an additional active period for a mobile device.

FIG. 7 is a flow diagram of an embodiment for a method 700 of determining a usage schedule and an additional active period for a mobile device. At block 705 of method 700, processing logic receives activity information of a mobile device. At block 710, processing logic determines a usage schedule of the mobile device based on the activity information and one or more first criteria. The first criteria may include activity thresholds, neighbor similarity thresholds, minimum scheduled inactive periods, and so forth.

At block 715, processing logic predicts data to be transferred to the mobile device during a scheduled inactive period. At block 720, processing logic determines an additional active period for the mobile device based on the predicted data and one or more second criteria. The second criteria may include data transfer likelihood thresholds, data size predictions, and so forth.

At block 725, processing logic transmits a first instruction to the mobile device that will cause the mobile device to transition to a low power state during the scheduled inactive period. In one embodiment, processing logic transfers the determined usage schedule to the mobile device. At block 730, processing logic transmits a second instruction to the mobile device that will cause the mobile device to transition out of the low power state to receive the predicted data during the determined additional active period and prior to a subsequent scheduled active period.

Figure 8:
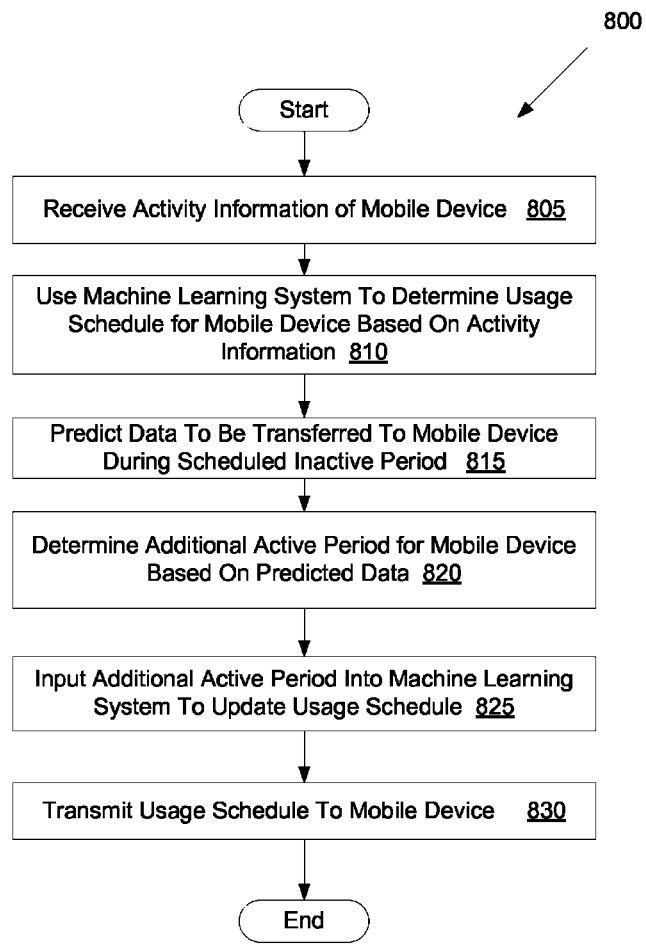
FIG. 8 is a flow diagram of an embodiment for a method of using activity information and an additional active period to determine a usage schedule for a mobile device.

FIG. 8 is a flow diagram of an embodiment for a method 800 of using activity information and an additional active period to determine a usage schedule for a mobile device. At block 805 of method 800, processing logic receives activity information of a mobile device. At block 810, processing logic uses a machine learning system (e.g., applies a machine learning algorithm) to determine a usage schedule for the mobile device based on the activity information. The activity information may be used as in input into the machine learning system, and a generated output may be the usage schedule.

At block 815, processing logic predicts data to be transferred to the mobile device during a scheduled inactive period. At block 820, processing logic determines an additional active period for the mobile device based on the predicted data. At block 825, processing logic inputs the additional active period into the machine learning system to update the usage schedule. At block 830, processing logic transmits the updated usage schedule to the mobile device.

Figure 9:
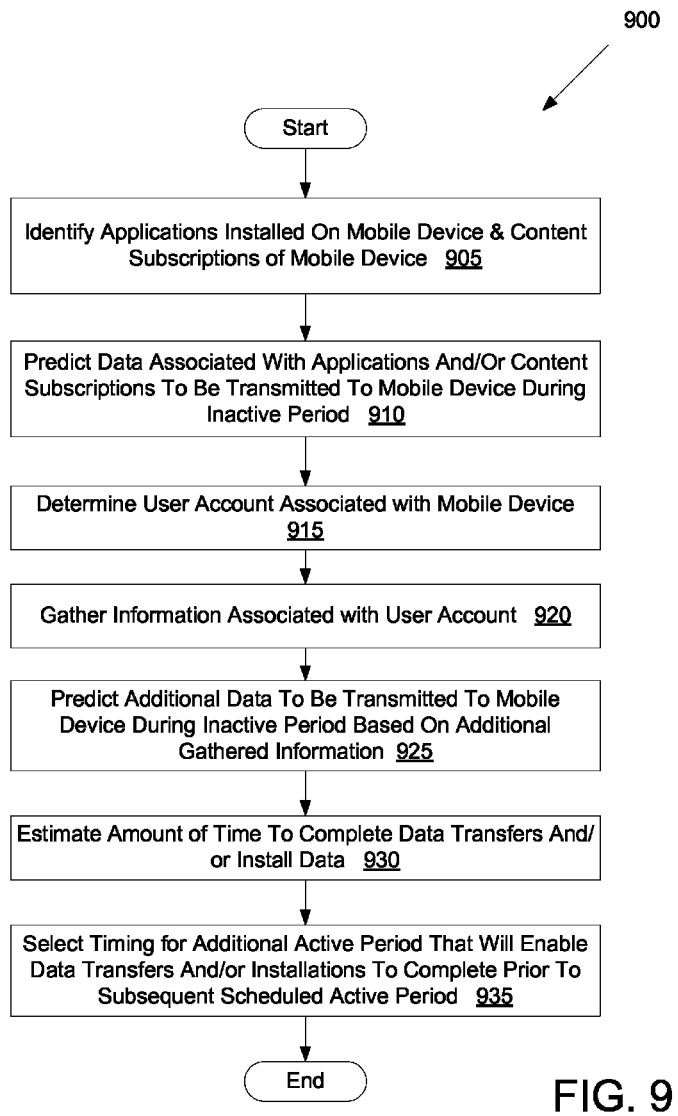
FIG. 9 is a flow diagram of an embodiment for a method of computing an additional active period to inject into a usage schedule of a mobile device.

FIG. 9 is a flow diagram of an embodiment for a method 900 of computing an additional active period to inject into a usage schedule of a mobile device. Method 900 may be performed at block 715 of method 700 and/or block 815 of method 800 in embodiments. At block 905 of method 900, processing logic identifies one or more applications installed on a mobile device and/or content subscriptions of the mobile device. At block 910, processing logic predicts data associated with the applications and/or content subscriptions that is to be transmitted to the mobile device during a scheduled inactive period.

At block 915, processing logic determines a user account associated with the user device. At block 920, processing logic gathers information associated with the user account. At block 925, processing logic predicts additional data to be transmitted to the mobile device during the inactive period based on additional gathered information. Examples of such additional gathered information may include scheduled backups, historic synchronization events of an operating system, and so forth.

At block 930, processing logic estimates an amount of time to complete all of the predicted data transfers and/or install data associated with the data transfers. At block 935, processing logic selects a timing for an additional active period that will enable data transfers and/or installations to complete prior to a subsequent scheduled active period.

Figure 10:
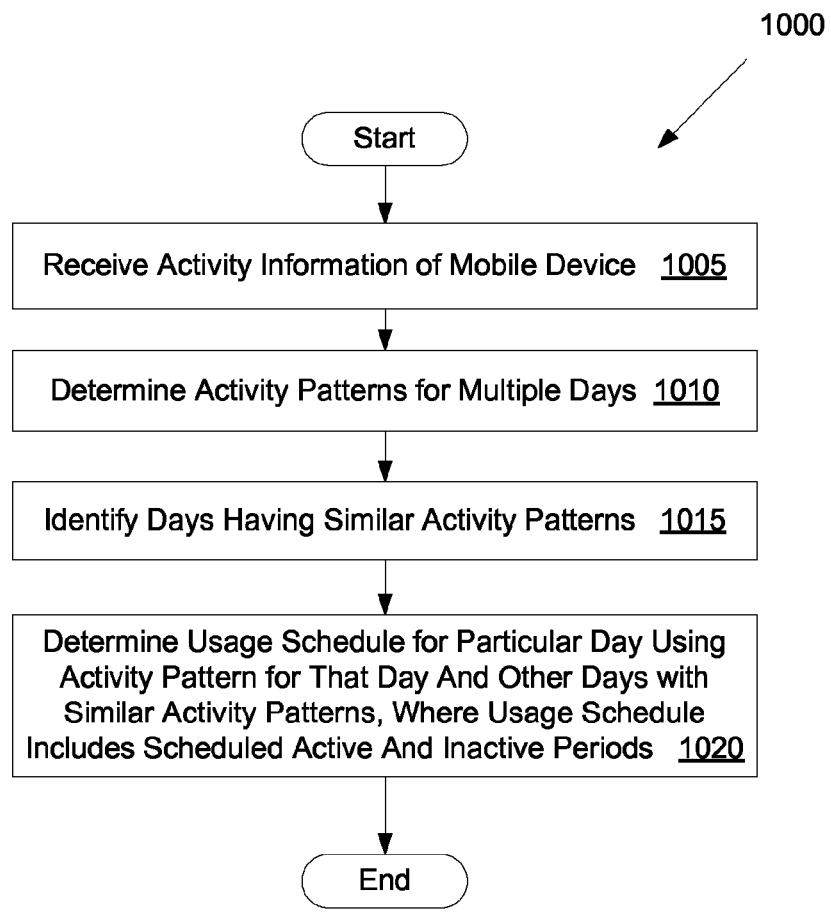
FIG. 10 is a flow diagram of an embodiment for a method of using a machine learning algorithm to determine a usage schedule for a mobile device.

FIG. 10 is a flow diagram of an embodiment for a method 1000 of using a machine learning algorithm to determine a usage schedule for a mobile device. Method 1000 may be performed, for example, at block 510 of method 500, block 620 of method 600, block 710 of method 700, block 810 of method 800, and so on. At block 1005 of method 1000, processing logic receives activity information of a mobile device. At block 1010, processing logic divides the activity information based on days of the week. Processing logic then determines activity patterns for each day of the week. This includes determining when a user uses the mobile device and when the mobile device is not used.

At block 1015, processing logic identifies days having similar activity patterns. In one embodiment, processing logic applies a K-nearest neighbors algorithm to determine days having similar activity patterns. At block 1020, processing logic determines a usage schedule for a particular day using the activity pattern for that day and the activity patterns for other days with similar activity patterns. The determined usage schedule includes scheduled active periods and scheduled inactive periods.

Figure 11:
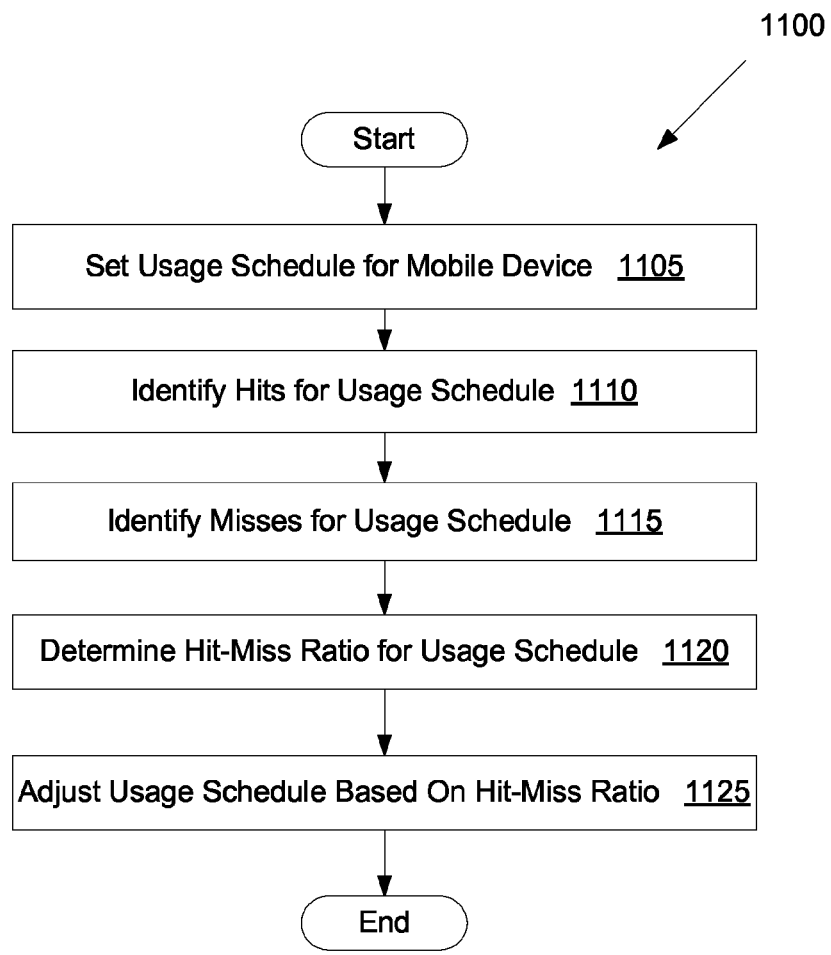
FIG. 11 is a flow diagram of an embodiment for a method of adjusting a usage schedule.

FIG. 11 is a flow diagram of an embodiment for a method 1100 of adjusting a usage schedule. At block 1105 of method 1100, processing logic sets a usage schedule for a mobile device (e.g., as set forth in method 1000). At block 1110, processing logic identifies hits for the usage schedule. A hit corresponds to a scheduled inactive period for which no user interaction was detected. A determination that the mobile device has not been used may be made based on absence of user input signals. For example, if no user input signals were received (e.g., from a touch screen, keyboard, buttons, etc.), then processing logic may determine that the device was not used during the inactive periods. Other information that may be analyzed to determine whether the mobile device was used during the inactive periods includes display state, wake locks and/or sensor data gathered during the active periods. For example, if the screen remained off during the inactive periods and/or there were no wake locks issued during the inactive periods, then processing logic may determine that the mobile device was not used. Additionally or alternatively, if one or more sensors of the mobile device such as an accelerometer or proximity sensor did not detect motion and/or a user proximity during the inactive periods, then processing logic may determine that the mobile device was unused during the inactive periods.

At block 1115, processing logic identifies misses for the usage schedule. A miss corresponds to a scheduled inactive period for which a user interaction was detected. At block 1120, processing logic determines a hit-miss ratio for the usage schedule. At block 1125, processing logic then adjusts the usage schedule based on the hit-miss ratio. For example, if the hit-miss ratio is high (e.g., above a first threshold), then processing logic may increase the duration of the scheduled inactive periods. If the hit-miss ratio is low (e.g., below a second threshold), then processing logic may decrease the duration of the scheduled inactive periods.

Figure 12:
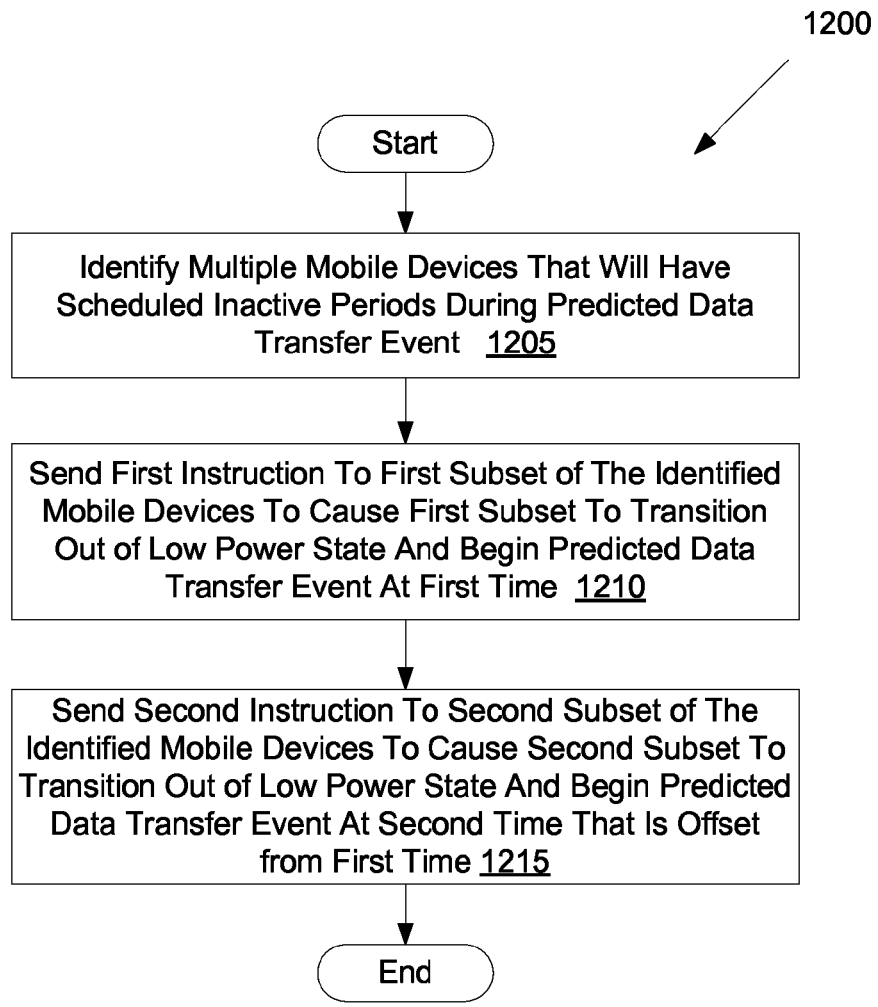
FIG. 12 is a flow diagram of an embodiment for a method of staggering additional active periods between mobile devices.

FIG. 12 is a flow diagram of an embodiment for a method 1200 of staggering additional active periods between mobile devices. At block 2015 of method 1200, processing logic identifies multiple devices that will have scheduled inactive periods during a predicted data transfer event or collection of data transfer events. At block 1210, processing logic sends a first instruction to a first subset of the identified mobile devices to cause the first subset to transition out of a low power state and begin the predicted one or more data transfer events at a first time. At block 1215, processing logic sends a second instruction to a second subset of the identified mobile devices to cause the second subset to transition out of a low power state and begin the predicted one or more data transfer events at a second time. By staggering the times at which the additional active periods occur between the mobile devices, a server may be load balanced over a time period.

Note that in additional embodiments processing logic may load balance based on all mobile devices that will have overlapping scheduled inactive periods. For example, processing logic may identify all mobile devices that will have scheduled inactive periods within a certain time range. Processing logic may then offset the additional active periods to inject into the usage schedules of these mobile devices regardless of the specific data transfers that are predicted to be made to these mobile devices.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "gathering", "determining", "identifying", "receiving", "transmitting", "transitioning" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving, by a processing device, activity information of a mobile device for a time period;

determining, by the processing device, a usage schedule for the mobile device based on the activity information, the usage schedule comprising scheduled active periods of the mobile device and scheduled inactive periods of the mobile device, wherein the scheduled active periods correspond to time periods during which the mobile device has at least a threshold probability of receiving user interaction and the scheduled inactive periods correspond to other time periods during which the mobile device has below the threshold probability of receiving user interaction;

determining that data is to be transferred to the mobile device during one of the scheduled inactive periods and further determining information about the data to be transferred;

determining an additional active period not included in the determined usage schedule for the mobile device based on the data, wherein the additional active period is a predetermined time period during which the mobile device is scheduled to perform at least one operation in association with the data;

transmitting at least one instruction to the mobile device to cause the mobile device to:

transition into a low power state during the scheduled inactive period, transition out of the low power state during a subsequent scheduled active period, and transition out of the low power state to perform the at least one operation during the additional active period and prior to the subsequent scheduled active period.

2. The method of claim 1, wherein to transition into the low power state the mobile device deactivates a wireless communication module, and wherein to transition out of the low power state the mobile device reactivates the wireless communication module.

3. The method of claim 1, wherein determining the additional active period comprises:

determining at least one of an application update, a notification, a synchronization event, or a backup event to be performed during the scheduled inactive period based on at least one of previous application updates, previous notifications, previous synchronization events, previous backup events, scheduled application updates, scheduled notifications, scheduled synchronization events, or scheduled backup events;

estimating an amount of time to complete at least one of the application update, the notification, the synchronization event or the backup event based on completion times of at least one of the previous application updates, the previous notifications, the previous synchronization events or the previous backup events; and selecting a timing for the unscheduled active period to enable at least one of the application update, the notification, the synchronization event or the backup event to be completed prior to the subsequent scheduled active period, wherein the timing is selected to be earlier than the subsequent scheduled active period by at least the estimated amount of time.

4. The method of claim 1, wherein the processing device is a component of a server computing device, the method further comprising:

determining a user account associated with the mobile device;

gathering additional information associated with the user account, wherein the additional information is collected from at least one device other than the mobile device; and using at least one of the activity information or the additional information as an input to a machine learning algorithm to define the usage schedule, wherein the machine learning algorithm identifies one or more activity patterns for the mobile device based on similarities in the activity information and the additional information and uses the one or more activity patterns to define the usage schedule.

5. A mobile computing device comprising:

a wireless communication module; and a processing device coupled to the wireless communication module, wherein the processing device is configured to:

receive a first instruction to transition into a low power state at a designated first time corresponding to a scheduled inactive period temporally between a first scheduled active period and a second scheduled active period, wherein the scheduled inactive period, the first scheduled active period and the second scheduled active period are defined in an initial usage schedule determined based on historical activity information of the mobile device;

receive a second instruction to transition out of the low power state at a second time corresponding to an additional active period not included in the initial usage schedule, wherein the additional active period is a predetermined time period during which the mobile device is scheduled to perform at least one operation;

after receipt of the first instruction and the second instruction, transition into the low power state at the designated first time, wherein transitioning into the low power state comprises deactivating the wireless communication module after the first scheduled active period elapses;

transition out of the low power state at the second time, wherein transitioning out of the low power state comprises activating the wireless communication module; and perform the at least one operation using the wireless communication module during the additional active period, wherein the at least one operation is completed prior to the second scheduled active period.

6. The mobile computing device of claim 5, further comprising:

a display operatively coupled with the processing device, wherein the processing device is further to:

determine the activity information of the mobile computing device, the activity information comprising information on at least one of time periods during which the display is active or time periods during which the mobile computing device is subject to a wake lock;

determine the initial usage schedule based on the activity information; and receive, from a remote computing device, an instruction to add the additional active period to the initial usage schedule.

7. The mobile computing device of claim 5, wherein the processing device is further to:

determine the activity information of the mobile computing device;

transmit the activity information to a remote computing device;

receive a first instruction to transition into the low power state at the first time; and receive a second instruction to transition out of the low power state at the second time.

8. The mobile computing device of claim 5, wherein:

the at least one operation comprises a transfer of data;

the data comprises at least one of an application update, a notification, or synchronization data; and the processing device accesses the data or an application associated with the data during the second scheduled active period responsive to user input.

9. The mobile computing device of claim 5, wherein the processing device is further to:

throttle or disable one or more additional components of the mobile computing device during the scheduled inactive period.

10. The mobile computing device of claim 5, wherein the processing device is further to:

determine that the mobile computing device has not been used during a plurality of scheduled active periods; and cause the mobile computing device to remain in the low power state during subsequent active periods until user input is detected.

11. A computer readable storage medium having instructions that, when executed by a processing device, cause the processing device to perform operations comprising:

determining, by the processing device, a usage schedule for a mobile device based on one or more first criteria associated with historical activity information of the mobile device, the usage schedule comprising a scheduled active period of the mobile device and a scheduled inactive period of the mobile device, wherein the scheduled active period corresponds to a time period during which the mobile device has at least a threshold probability of being used and the scheduled inactive period corresponds to an additional time period during which the mobile device has below the threshold probability of being used;

determining an additional active period not included in the usage schedule for the mobile device, wherein the additional active period is based on one or more second criteria, and wherein the additional active period is a predetermined time period during which the mobile device is scheduled to perform at least one operation; and prior to the scheduled inactive period, performing the following comprising:

sending a first instruction to the mobile device, wherein the first instruction causes the mobile device to transition into a low power state during the scheduled inactive period; and sending a second instruction to the mobile device, wherein the second instruction causes the mobile device to transition out of the low power state during the additional active period prior to the scheduled active period, wherein the mobile device is to perform the at least one operation during the additional active period and prior to the scheduled active period.

12. The computer readable storage medium of claim 11, wherein the at least one operation comprises a transfer of data, the method further comprising:

receiving activity information of the mobile device, wherein the one or more first criteria are associated with the activity information; and determining the data to be transferred to the mobile device, wherein the one or more second criteria are associated with the data.

13. The computer readable storage medium of claim 12, wherein determining the data to be transferred comprises predicting at least one of an application update, a notification, a synchronization event, or a backup event to be performed during the scheduled inactive period, the method further comprising:

estimating an amount of time to complete at least one of the application update, the notification, the synchronization event or the backup event; and selecting a timing for the unscheduled active period that enables at least one of the application update, the notification, the synchronization event or the backup event to be completed prior to the subsequent scheduled active period.

14. The computer readable storage medium of claim 12, wherein determining the data to be transferred comprises:

determining past data that a service attempted to transmit to the mobile device during one or more previous scheduled inactive periods; and determining that the service is to transmit additional data that is similar to the past data during the scheduled inactive period.

15. The computer readable storage medium of claim 11, the method further comprising:

determining a user account associated with the mobile device; and determining information associated with the user account, wherein at least one of the one or more first criteria or the one or more second criteria are associated with the information associated with the user account.

16. The computer readable storage medium of claim 11, the method further comprising:

determining a plurality of mobile devices that have scheduled inactive periods during a determined data transfer event;

sending a third instruction to a first subset of the plurality of mobile devices to cause the first subset to transition out of the low power state and begin the determined data transfer event at a first time; and sending a fourth instruction to a second subset of the plurality of mobile devices to cause the second subset to transition out of the low power state and begin the determined data transfer event at a second time.

17. The computer readable storage medium of claim 11, the method further comprising:

determining that the mobile device has not been used during a plurality of scheduled active periods; and instructing the mobile computing device to remain in the low power state during subsequent active periods until user input is detected.

18. The computer readable storage medium of claim 11, wherein determining the usage schedule for a day comprises:
- determining an activity pattern for the day;
- determining one or more additional days having similar activity patterns; and
- applying a machine learning algorithm using the activity pattern for the day and the activity patterns for the one or more additional days to determine the scheduled active period and the scheduled inactive period for the day.

19. The computer readable storage medium of claim 18, the method further comprising:
- using the additional active period as an additional input for the machine learning algorithm.

20. The computer readable storage medium of claim 11, the method further comprising:
- identifying one or more hits for the usage schedule, wherein a hit is identified where no user activity has been detected for a scheduled inactive period;
- identifying one or more misses for the usage schedule, wherein a miss is identified where user activity has been detected for a scheduled inactive period;
- determining a hit-miss ratio for the usage schedule based on the one or more hits and the one or more misses; and
- adjusting the usage schedule based on the hit-miss ratio.

* * * * *